United States Patent
Ishikawa et al.

(10) Patent No.: US 10,890,218 B2
(45) Date of Patent: Jan. 12, 2021

(54) HYDRAULIC CIRCUIT OF DRIVING DEVICE FOR VEHICLE

(71) Applicant: HONDA MOTOR CO., LTD., Tokyo (JP)

(72) Inventors: Hisashi Ishikawa, Wako (JP); Yuji Okazaki, Wako (JP); Shigeji Nakano, Wako (JP); Hideaki Iwashita, Wako (JP); Yuya Shimota, Wako (JP); Noriyuki Yagi, Wako (JP); Yoshihiro Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/555,305

(22) Filed: Aug. 29, 2019

(65) Prior Publication Data

US 2020/0072299 A1 Mar. 5, 2020

(30) Foreign Application Priority Data

Aug. 30, 2018 (JP) .................................. 2018-162161
Aug. 23, 2019 (JP) .................................. 2019-153303

(51) Int. Cl.
*F16D 25/12* (2006.01)
*B60K 6/38* (2007.10)
*F16D 48/02* (2006.01)
*B60K 6/387* (2007.10)

(52) U.S. Cl.
CPC .......... *F16D 25/14* (2013.01); *F16D 25/123* (2013.01); *B60K 6/387* (2013.01); *B60Y 2200/92* (2013.01)

(58) Field of Classification Search
None
See application file for complete search history.

(56) References Cited

U.S. PATENT DOCUMENTS

| | | | | | |
|---|---|---|---|---|---|
| 2,833,385 | A | * | 5/1958 | Peterson | ................. F16D 25/14 192/113.1 |
| 4,529,073 | A | * | 7/1985 | Lewis | ................... F16D 25/123 192/70.12 |
| 4,706,789 | A | * | 11/1987 | McColl | ................... F16D 25/14 477/180 |
| 5,577,588 | A | * | 11/1996 | Raszkowski | ............ F16D 13/74 192/113.35 |

(Continued)

FOREIGN PATENT DOCUMENTS

JP 2014-77461 A 5/2014

*Primary Examiner* — Colby M Hansen
(74) *Attorney, Agent, or Firm* — Westerman, Hattori, Daniels & Adrian, LLP

(57) ABSTRACT

A hydraulic circuit includes a first shift valve and a second shift valve that are provided in series between a source oil path through which oil whose pressure has been regulated flows and a first clutch oil path and a second clutch oil path. The first shift valve is selectively switchable between a first switching state where a first communicating oil path and the first clutch oil path are communicated and a second switching state where a second communicating oil path and the second clutch oil path are communicated, and the second shift valve is selectively switchable between a third switching state where the source oil path and the first communicating oil path are communicated and a fourth switching state where the source oil path and the second communicating oil path are communicated.

8 Claims, 14 Drawing Sheets

(56) References Cited

U.S. PATENT DOCUMENTS

| | | | | |
|---|---|---|---|---|
| 7,971,697 B2* | 7/2011 | Kemmner | ............... | F16D 25/14 192/85.24 |
| 2004/0159520 A1* | 8/2004 | Anwar | ................... | F16D 25/14 192/70.12 |
| 2015/0321553 A1* | 11/2015 | Pritchard | .............. | F16D 25/123 192/48.601 |

* cited by examiner

| CL OIL<br>PATH STATE | FIRST<br>SHIFT VALVE | SECOND<br>SHIFT VALVE |
|---|---|---|
| Lo RELEASED<br>Hi RELEASED | ×<br>SET | ×<br>SET |
| Lo ENGAGED<br>Hi RELEASED | ×<br>SET | ○<br>OPERATING |
| Lo RELEASED<br>Hi ENGAGED | ○<br>OPERATING | ×<br>SET |
| Lo RELEASED<br>Hi RELEASED | ○<br>OPERATING | ○<br>OPERATING |

FIG. 8B

| State of CL oil path | First Shift Valve | Second Shift Valve | Third Shift Valve |
|---|---|---|---|
| Lo released<br>Hi released | ×<br>Set state | ×<br>Set state | ○<br>Operating state |
| Lo engaged<br>Hi released | ×<br>Set state | ○<br>Operating state | ○<br>Operating state |
| Lo released<br>Hi engaged | ○<br>Operating state | ×<br>Set state | ○<br>Operating state |
| Lo released<br>Hi released | ○<br>Operating state | ○<br>Operating state | ×<br>Set state |

HYDRAULIC CIRCUIT OF DRIVING DEVICE FOR VEHICLE

CROSS REFERENCES TO RELATED APPLICATIONS

The present application claims priority under 35 U.S.C. § 119 to Japanese Patent Application Nos. 2018-162161 filed Aug. 30, 2018 and 2019-153303 filed Aug. 23, 2019, entitled "Hydraulic Circuit of Driving Device for Vehicle." The contents of this application are incorporated herein by reference in their entirety.

BACKGROUND

1. Field

The present disclosure relates to a hydraulic circuit of a driving device for a vehicle. More specifically, the present disclosure relates to a hydraulic circuit of a driving device for a vehicle that is configured to supply oil to a plurality of clutches provided on a power transmission path for transmitting power from a power source of a vehicle to drive wheels.

2. Description of the Related Art

Conventionally, for example, a hydraulic circuit described in Japanese Unexamined Patent Application Publication No. 2014-77461 is known as a hydraulic circuit of a driving device mounted in a vehicle. This hydraulic circuit described in Japanese Unexamined Patent Application Publication No. 2014-77461 includes an oil pump that is driven by an engine, a clutch oil path connected to an oil chamber of a clutch, a cooling oil path for guiding oil to a part to be cooled, a pressure-regulating valve that adjusts a pressure of oil ejected from the oil pump, and a shift valve that switches a path of the oil whose pressure has been regulated by the pressure-regulating valve, and supply of oil to the clutch oil path and the cooling oil path is switched by switching the pressure-regulating valve and the shift valve.

In the hydraulic circuit described in Japanese Unexamined Patent Application Publication No. 2014-77461, oil is supplied to only one clutch through the clutch oil path. However, in a case where a power transmission device includes a plurality of clutches, the hydraulic circuit need be configured so as to supply oil to each of oil chambers of the plurality of clutches. In this case, it is necessary to employ a configuration in which occurrence of a situation in which the plurality of clutches are simultaneously engaged (fastened) as a result of switching of an oil path is suppressed while reducing cost by making the number of components such as a valve and a hydraulic sensor provided in the hydraulic circuit as small as possible and a failure of a valve or the like can be speedily and accurately grasped so that necessary fail safe operation can be performed promptly even in a case where such a failure occurs in the valve or the like.

SUMMARY

The present application describes a hydraulic circuit of a driving device for a vehicle that can properly supply oil to oil chambers of a plurality of clutches with a simple configuration in which the number of components is kept small.

A hydraulic circuit of a driving device for a vehicle according to the present disclosure includes: a first clutch (21) and a second clutch (22) that are provided on a power transmission path that transmits power from a power source (10) of the vehicle to a drive wheel (20); a first clutch oil path (L31) connected to an oil chamber of the first clutch (21); a second clutch oil path (L32) connected to an oil chamber of the second clutch (22); a pressure-regulating valve (61) that regulates a pressure of oil ejected from an oil pump (OP1); a source oil path (L4) through which oil whose pressure has been regulated by the pressure-regulating valve (61) flows; a first shift valve (81) for switching communication and non-communication between (i) the first clutch oil path (L31) and the second clutch oil path (L32) and (ii) a first communicating oil path (L6) and a second communicating oil path (L7); a first solenoid valve (71) that performs the switching using the first shift valve (81); a second shift valve (82) for switching communication and non-communication between (i) the first communicating oil path (L6) and the second communicating oil path (L7) and (ii) the source oil path (L4); and a second solenoid valve (72) that performs the switching using the second shift valve (82), wherein the first shift valve (81) is selectively switchable between a first switching state ("operating" in the embodiment that will be described later) where the first communicating oil path (L6) and the first clutch oil path (L31) are communicated and a second switching state ("set" in the embodiment that will be described later) where the second communicating oil path (L7) and the second clutch oil path (L32) are communicated, and the second shift valve (82) is selectively switchable between a third switching state ("set" in the embodiment that will be described later) where the source oil path (L4) and the first communicating oil path (L6) are communicated and a fourth switching state ("operating" in the embodiment that will be described later) where the source oil path (L4) and the second communicating oil path (L7) are communicated.

According to the hydraulic circuit of a driving device for a vehicle according to the present disclosure, two shift valves, i.e., the first shift valve and the second shift valve are provided in series as a configuration for switching an oil path between the source oil path through which oil whose pressure has been regulated by the pressure-regulating valve flows and the first and second clutch oil paths, and it is therefore possible to switch a state where only one of the first and second clutch oil paths is engaged and a state where both of the first and second clutch oil paths are released as described below by switching states of the first and second shift valves. That is, in a case where the first shift valve is set to the second switching state (set) and the second shift valve is set to the fourth switching state (operating), oil is not supplied to the first clutch oil path, and oil is supplied to the second clutch oil path only. This releases the first clutch and engages the second clutch. In a case where the first shift valve is set to the first switching state (operating) and the second shift valve is set to the third switching state (set), oil is not supplied to the second clutch oil path, and oil is supplied to the first clutch oil path only. This engages the first clutch and releases the second clutch. In a case where the first shift valve is set to the second switching state (set) and the second shift valve is set to the third switching state (set), oil is not supplied to the first clutch oil path nor the second clutch oil path. This releases both of the first clutch and the second clutch. Also in a case where the first shift valve is set to the first switching state (operating) and the second shift valve is set to the fourth switching state (operating), oil is not supplied to the first clutch oil path nor the second clutch oil path. This releases both of the first clutch and the second clutch.

With the above configuration, the hydraulic circuit is a hydraulic circuit that has no risk of occurrence of a phenomenon (simultaneous engagement) in which the first clutch and the second clutch are simultaneously engaged, irrespective of setting of switching of the first and second shift valves. In particular, there is no risk of simultaneous supply of oil to the first clutch oil path and the second clutch oil path since communication between the source oil path and the first and second communicating oil paths is selectively switched by the second shift valve.

Since the first and second shift valves configured as above are connected in series, both of the first clutch and the second clutch can be released both by setting the first shift valve to the second switching state (set) and setting the second shift valve to the second switching state (set) and by setting the first shift valve to the first switching state (operating) and setting the second shift valve to the fourth switching state (operating).

This hydraulic circuit may include an oil pressure detection unit (47) that detects an oil pressure of the first communicating oil path (L6).

According to this configuration, the oil pressure detection unit is provided in the first communicating oil path through which oil from the second shift valve flows and that is communicated with the first clutch oil path through the first shift valve. Therefore, even if a failure in which the second shift valve and the second solenoid valve cannot shift into the fourth switching state (operating) occurs in the second shift valve and the second solenoid valve, such a failure can be speedily detected on the basis of a change of the oil pressure of the first communicating oil path. This allows speedy shift into necessary fail safe operation. That is, if an oil pressure detection unit is provided in the second communicating oil path, the failure is detected on the basis of a change of an oil pressure of oil supplied to the second clutch (i.e., absence of proper rise of the oil pressure of the second communicating oil path), and therefore accuracy of detection depends on a configuration variation of the second clutch such as energizing force of an energizing unit such as a return spring provided in the oil chamber (piston chamber) of the second clutch. This may undesirably inhibit speedy detection of a failure. Meanwhile, in a case where the oil pressure detection unit is provided in the first communicating oil path as in the present disclosure, it is possible to speedily and accurately detect a failure since it is easier to detect absence of proper drop of an oil pressure of the first communicating oil path.

This hydraulic circuit may further include a third solenoid valve (73) that performs the pressure regulating using the pressure-regulating valve (61), wherein the pressure-regulating valve (61) is selectively switchable between a fifth switching state where the pressure of the oil is regulated to a high oil pressure that is relatively high as an oil pressure supplied to the source oil path (L4) and a sixth switching state where the pressure of the oil is regulated to a low oil pressure that is relatively low as an oil pressure supplied to the source oil path (L4) by switching on and off of the third solenoid valve (73).

According to this configuration, even in a case where a failure in which the pressure-regulating valve or the third solenoid valve cannot be switched to the fifth switching state (operating) occurs in the pressure-regulating valve or the third solenoid valve, the oil pressure detection unit provided in the first communicating oil path makes it possible to speedily detect the failure on the basis of a change of the oil pressure of the first communicating oil path. This allows speedy shift to necessary fail safe operation. Furthermore, the oil pressure detection unit provided in the first communicating oil path makes it possible to detect the failure in a mode in which oil is supplied to the first communicating oil path. That is, the failure can be detected in a larger number of modes than a case where an oil pressure sensor is provided in the second communicating oil path. It is therefore possible to improve accuracy of detection of a failure.

This hydraulic circuit may be configured such that centrifugal force that acts on oil in an oil chamber of the first clutch (21) is larger than centrifugal force that acts on oil in an oil chamber of the second clutch (22); and a length of the first clutch oil path (L31) is shorter than a length of a combination of the second clutch oil path (L32) and the second communicating oil path (L7).

According to this configuration, since centrifugal force that acts on oil in an oil chamber of the first clutch is larger than centrifugal force that acts on oil in an oil chamber of the second clutch, it is feared that response of switching between clutch engagement and release based on supply or discharge of oil to and from an oil chamber is harder to assure in the first clutch (than in the second clutch). Meanwhile, according to the above configuration, it is possible to increase response of engagement of the first clutch since the first clutch oil path that is an oil path through which oil is to be supplied in a case where a mode of preparation of engagement of the first clutch switches to engagement of the first clutch is shorter than a combination of the second clutch oil path and the second communicating oil path that are oil paths through which oil is to be supplied in a case where a mode of preparation of engagement of the second clutch switches to engagement of the second clutch. That is, this hydraulic circuit is a hydraulic circuit that places importance on response of engagement of the first clutch.

The hydraulic circuit may further include a third communicating oil path (L7) through which the oil flows via the first communicating oil path (L6) and the second communicating oil path (L7) and an oil pressure detecting means (47-2; an oil pressure detector) configured to detect oil pressure in the third communicating oil path, wherein the first shift valve (81-2) allows the first communicating oil path (L6) and the third communicating oil path (L10) to communicate in the first switching state and allows the second communicating oil path (L7) and the third communicating oil path (L10) to communicate in the second switching state.

According to this configuration, it is possible to detect the oil pressure in the first clutch and the second clutch by the oil pressure detector provided in the third communicating oil path. Therefore, it is possible to monitor the states of the first and second clutches by using only the single oil pressure detector, as well as the states of the first shift valve, the first solenoid valve, the second shift valve, and/or the second solenoid valve, thereby to realize the hydraulic circuit having high reliability with lower cost.

The hydraulic circuit may further include at least one of: a first flow amount regulator (91) disposed in the first clutch oil path (L31) and a second flow amount regulator (92) disposed in the second clutch oil path (L32), so that the oil pressure in the oil pressure detector (47-2) can increase faster than the oil pressure in the first or second clutch (21 or 22).

According this configuration, since the oil pressure in the oil pressure detector (47-2) can increase faster than the oil pressure in the first or second clutch (21 or 22), even if the first or second clutch, the first or second shift valve, or the first or second solenoid valve causes breakdown or malfunction, such problem can immediately be detected, thereby allowing for quick transition to a necessary fail-safe operation.

The hydraulic circuit may further include a third shift valve (83) configured to switchably allow and stop the communication of the oil in the source oil path (L4) between the pressure-regulating valve (61) and the second shift valve (82); and a third solenoid valve (73) configured to actuate the first shift valve to perform the switching with the third shift valve.

According to this configuration, because of the presence of the third shift valve, even under undetectable conditions (where monitoring cannot be conducted), it is possible to prevent the supply of oil toward the downstream side of the source oil path by only stopping the communication in the source oil path by the third shift valve. Thus, this allows for simple and quick transition to a necessary fail-safe operation, thereby increasing tolerance against in any breakdown which may occur by chance.

In the hydraulic circuit, the third solenoid valve (73) is further configured to conduct pressure regulation with the pressure-regulating valve (61), the pressure-regulating valve (61) is configured to selectably switch a state of communication by switching ON and OFF of the third solenoid valve (73) between: a fifth switching state where the oil having a relatively higher pressure is pressure-regulated and supplied to the source oil path (L4); and a sixth switching state where the oil having a relatively lower pressure is pressure-regulated and supplied to the source oil path (L4).

According to this configuration, since the oil pressure detector is provided in the third communicating oil path, even if the pressure-regulating valve or the third solenoid valve has the problem to switching to the fifth switching state (operation), it is possible to immediately detect such problem based on alteration of the oil pressure in the third communicating oil path, thereby allowing for quick transition to a fail-safe operation.

The signs in the parentheses indicate, for reference, reference signs in the drawings given to corresponding constituent elements in an embodiment that will be described later.

According to the hydraulic circuit of a driving device for a vehicle according to the present disclosure, it is possible to properly supply oil to oil chambers of a plurality of clutches with a simple configuration in which the number of components is kept small.

BRIEF DESCRIPTION OF THE DRAWINGS

FIG. 8B is a table showing switching patterns between connections and disconnections of the high clutch and the low clutch.

DESCRIPTION OF THE PREFERRED EMBODIMENTS

First Embodiment

Figure 1:
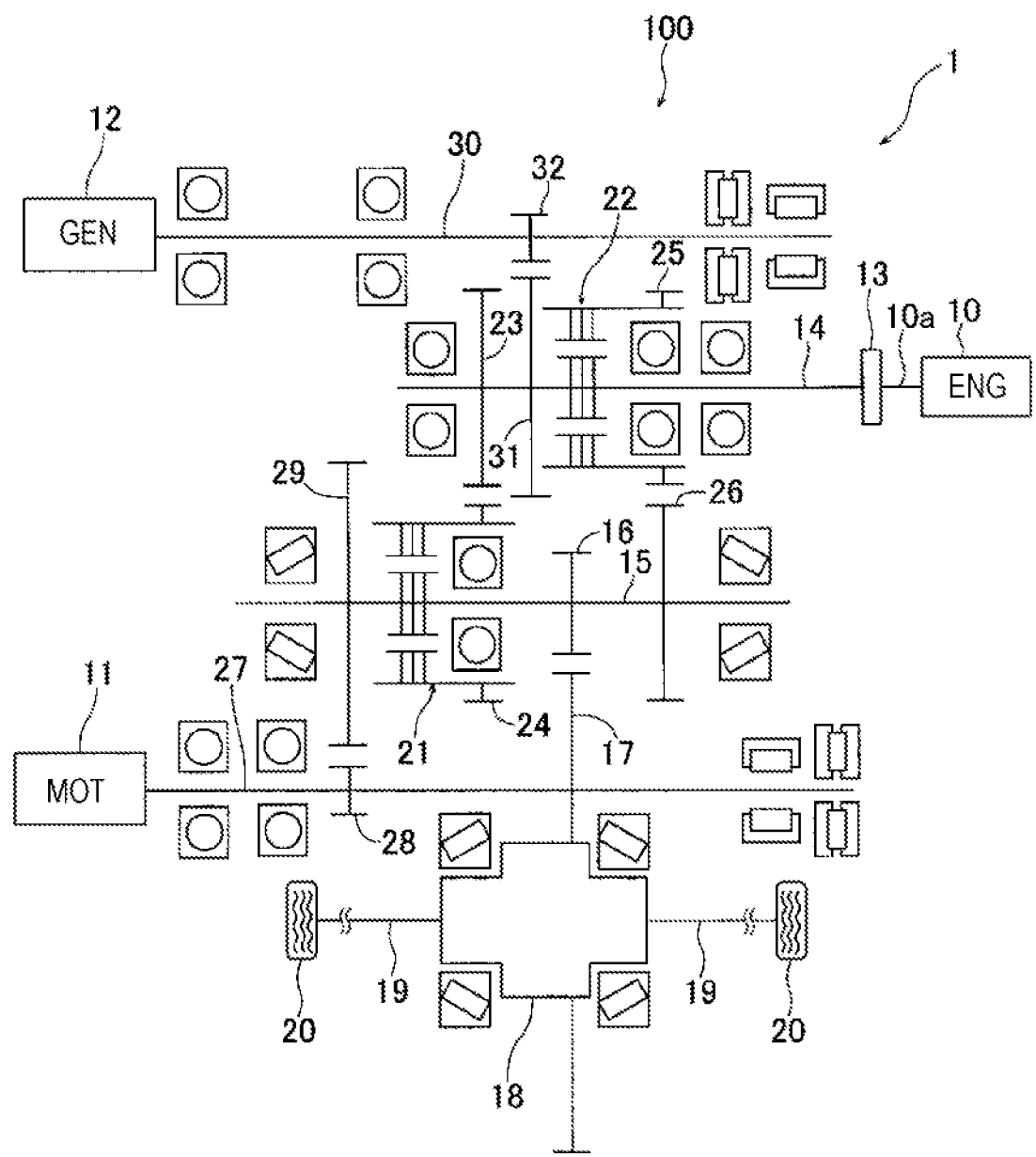
FIG. 1 is a skeleton diagram illustrating an overall configuration of a vehicle including a driving device according to an embodiment of the present disclosure.

An embodiment of the present disclosure is described below with reference to the attached drawings. FIG. 1 is a skeleton diagram illustrating an overall configuration of a vehicle including a driving device according to the embodiment of the present disclosure. First, a structure of the driving device is described by using FIG. 1. As illustrated in FIG. 1, a driving device 100 mounted in a vehicle 1 includes an engine (internal-combustion engine) 10, a first electric motor (traction motor) 11, and a second electric motor (generator) 12.

The first electric motor 11 is driven by electric power supplied from a battery (not illustrated) and can give driving force to the vehicle 1. During deceleration, the first electric motor 11 can charge (energy regeneration) the battery with electric power generated by rotary driving from wheels (drive wheels) 20. Furthermore, the second electric motor 12 can charge the battery with electric power generated mainly by rotary driving of the engine 10. As described above, the vehicle 1 in which the driving device 100 is mounted is a hybrid vehicle in which the engine 10 and the first electric motor 11 are used as drive sources and electric power can be generated by the first electric motor 11 and the second electric motor 12.

The driving device 100 includes an input shaft 14 coupled to an output shaft (crankshaft) 10a of the engine 10 through a flywheel 13, an output shaft 15 disposed parallel with the input shaft 14, a motor shaft 27, and a generator shaft 30. The output shaft 15 is connected to the left and right wheels (drive wheels) 20 through a final drive gear 16, a final driven gear 17, a differential gear 18, and left and right drive shafts 19.

The output shaft 15 supports a first driven gear 24 through a high clutch (first clutch) 21, and the first driven gear 24 meshes with a first drive gear 23 fixed to the input shaft 14. The input shaft 14 supports a second drive gear 25 through a low clutch (second clutch) 22, and this second drive gear 25 meshes with a second driven gear 26 fixed to the output shaft 15.

A third drive gear 28 fixed to the motor shaft 27 and a third driven gear 29 fixed to the output shaft 15 mesh with each other, and a fourth drive gear 31 fixed to the input shaft 14 and a fourth driven gear 32 fixed to the generator shaft 30 mesh with each other.

According to the driving device 100 configured as above, when the first electric motor 11 is driven, driving force of the first electric motor 11 is transmitted to the left and right wheels 20 through the motor shaft 27, the third drive gear 28, the third driven gear 29, the output shaft 15, the final drive gear 16, the final driven gear 17, the differential gear 18, and the drive shafts 19 in this order.

The first electric motor 11 can rotate in both forward and reverse directions and therefore can cause the vehicle 1 to travel forward and backward in accordance with a direction of the rotation. During deceleration of the vehicle 1, in a case where the first electric motor 11 functions as a generator by being driven by driving force transmitted from the wheels 20, kinetic energy of the vehicle 1 can be collected as electric energy.

Meanwhile, in a case where the engine 10 is driven in a state where the high clutch 21 is fastened and the low clutch 22 is released, driving force of the engine 10 is transmitted to the left and right wheels 20 through the input shaft 14, the first drive gear 23, the first driven gear 24, the high clutch 21, the output shaft 15, the final drive gear 16, the final driven gear 17, the differential gear 18, and the drive shafts 19 in this order (engine travelling high mode). In a case where the engine 10 is driven in a state where the low clutch 22 is fastened and the high clutch 21 is released, driving force of the engine 10 is transmitted to the left and right wheels 20 through the input shaft 14, the low clutch 22, the second drive gear 25, the second driven gear 26, the output shaft 15, the final drive gear 16, the final driven gear 17, the differential gear 18, and the drive shafts 19 in this order (engine travelling low mode).

In this case, by causing the first electric motor 11 to idle, the vehicle 1 can be caused to travel forward only by driving force of the engine 10. During forward travelling of the vehicle 1, driving force of the first electric motor 11 can be assisted by driving force of the engine 10.

During driving of the engine 10, driving force of the engine 10 is transmitted to the second electric motor 12 through the input shaft 14, the fourth drive gear 31, the fourth driven gear 32, and the generator shaft 30 in this order. The second electric motor 12 can thus generate electric power. Conversely, in a case where the second electric motor 12 is driven as a motor during stoppage of the engine 10, the engine 10 can be started by driving force of the second electric motor 12.

Figure 2:
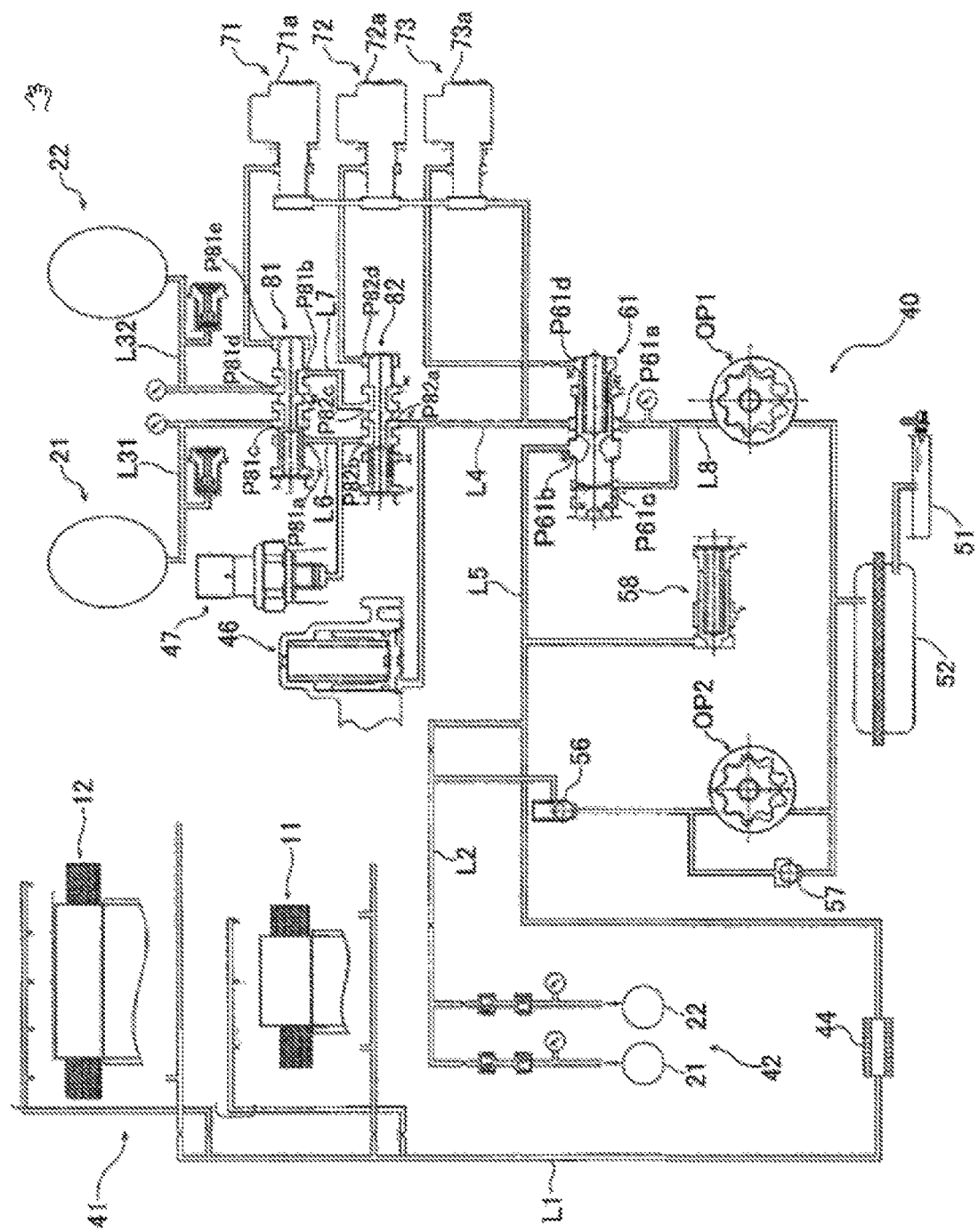
FIG. 2 illustrates a hydraulic circuit according to the first embodiment of the present disclosure.

Next, a hydraulic circuit according to the embodiment of the present disclosure is described. FIG. 2 illustrates a hydraulic circuit of a driving device for a vehicle. The hydraulic circuit 40 illustrated in FIG. 2 supplies an appropriate oil pressure to a cooling oil path L1, a lubricating oil path L2, a high clutch oil path (first clutch oil path) L31, and a low clutch oil path (second clutch oil path) L32.

The hydraulic circuit 40 includes a first oil pump (main pump) OP1 and a second oil pump (sub-pump) OP2 that are driven by the engine 10 that is a drive source of the vehicle 1. Properties of the first oil pump OP1 used mainly for gear change are set so that an ejection pressure is relatively high and an ejection flow amount is relatively small, and properties of the second oil pump OP2 used mainly for lubrication are set so that an ejection pressure is relatively low and an ejection flow amount is relatively large. This makes it possible to reduce a total drive load of an oil pressure source of the driving device 100.

The cooling oil path L1 is an oil path for cooling a part to be cooled 41 by using oil. In this example, the part to be cooled 41 is the first electric motor 11 and the second electric motor 12. The cooling oil path L1 is provided with an oil cooler 44. The lubricating oil path L2 is an oil path for lubricating a part to be lubricated 42 by using oil. In this example, the part to be lubricated 42 is, for example, friction materials of the high clutch 21 and the low clutch 22. The high clutch oil path L31 and the low clutch oil path L32 are oil paths for supplying oil to the high clutch 21 and the low clutch 22, respectively, and are connected to an oil chamber of the high clutch 21 and an oil chamber of the low clutch 22, more specifically, a back-pressure chamber of the high clutch 21 and a back-pressure chamber of the low clutch 22, respectively.

Furthermore, an electronic control unit (ECU) (not illustrated) for controlling electric power supply, energy regeneration (charging), and the driving device 100 is mounted in the vehicle, and this ECU controls components such as the first electric motor 11, the second electric motor 12, and the hydraulic circuit 40 (e.g., first, second, and third solenoid valves 71, 72, and 73 that will be described later).

The ECU includes a CPU that executes various kinds of arithmetic processing and a storage device (memory) constituted by a ROM and a RAM in which various kinds of arithmetic programs executed by the CPU, various kinds of tables, computation results, and the like are stored. The ECU receives various kinds of electric signals and supplies a drive signal based on a computation result or the like to an outside.

The hydraulic circuit 40 includes a regulator valve (pressure-regulating valve) 61, a first solenoid valve 71, a second solenoid valve 72, a third solenoid valve 73, a first shift valve 81, and a second shift valve 82.

The regulator valve 61 includes a spool energized leftward by a spring. The spool has a groove, and a first port P61$a$, a second port P61$b$, a feedback port P61$c$, and a fourth port P61$d$ that face an outer circumferential surface of the spool are formed. The first port P61$a$ is connected to a source oil path L8 and a clutch source oil path L4, the second port P61$b$ is connected to a lubricating oil path L2 through a cooling lubricating source oil path L5, the feedback port P61$c$ is connected to the source oil path L8, and the fourth port P61$d$ is connected to the third solenoid valve 73.

The first shift valve 81 includes a spool energized rightward by a spring. The spring has a groove, and a first port P81$a$, a second port P81$b$, a third port P81$c$, a fourth port P81$d$, and a fifth port b that face an outer circumferential surface of the spool are formed. The first port P81$a$ is connected to a second port P82$b$ of the second sift valve 82 through a high-pressure side communicating path L6, the second port P81$b$ is connected to a third port P82$c$ of the second shift valve 82 through a low-pressure side communicating oil path L7, the third port P81$c$ is connected to the high clutch oil path L31, the fourth port P81$d$ is connected to the low clutch oil path L32, and the fifth port P81$e$ is connected to the first solenoid valve 71.

The second shift valve 82 includes a spool energized rightward by a spring. The spool has a groove, and a first port P82$a$, the second port P82$b$, the third port P82$c$, and a fourth port P82$d$ that face an outer circumferential surface of the spool are formed. The first port P82$a$ is connected to the regulator valve 61 through the clutch source oil path L4, the second port P82$b$ is connected to the first port P81$a$ of the first shift valve 81 through the high-pressure side communicating oil path L6, the third port P82$c$ is connected to the second port P81$b$ of the first shift valve 81 through the low-pressure side communicating path L7, and the fourth port P82$d$ is connected to the second solenoid valve 72.

The high-pressure side communicating oil path L6 is provided with an oil pressure sensor (an oil pressure detection unit) 47 for detecting an oil pressure of the high-pressure side communicating oil path L6. An accumulator 46 is connected to the clutch source oil path L4. Furthermore, a relief valve 58 is connected to the cooling lubricating source oil path L5.

An ejection port of the first oil pump OP1 is connected to the first port P61$a$ of the regulator valve 61 through the source oil path L8. When the first oil pump OP1 is driven, oil is lifted up from an oil pan 51 and is supplied to the regulator valve 61 through a strainer 52.

Meanwhile, when the second oil pump OP2 is driven, oil lifted up from the oil pan 51 is supplied to the lubricating oil path L2. Two check valves (one-way valves) 56 and 57 for preventing aeration from occurring in the second oil pump OP2 during backward travelling of the vehicle 1 are provided between the second oil pump OP2 and the lubricating oil path L2.

The regulator valve 61 is configured to be selectively switchable between an operating state (a fifth switching state according to the present disclosure) in which a high line pressure (an oil pressure that is high to such a degree that the high clutch 21 and the low clutch 22 can operate) is supplied to the clutch source oil path L4 connected to the second shift valve 82 and a set state (a sixth switching state according to the present disclosure) in which a low line pressure (an oil pressure that is low to such a degree that the high clutch 21 and the low clutch 22 cannot operate) is supplied to the clutch source oil path L4 by regulating a pressure of oil ejected from the first oil pump OP1. The regulator valve 61 supplies an oil pressure to the cooling lubricating source oil path L5 communicated with the cooling oil path L1 and the lubricating oil path L2 in both of the operating state and the set state.

The first shift valve 81 is configured to be selectively switchable between a set state (a second switching state according to the present disclosure) in which the high-pressure side communicating oil path L6 and the high clutch oil path L31 are not communicated (cut off) and the low-pressure side communicating oil path L7 and the low clutch oil path L32 are communicated and an operating state (a first switching state according to the present disclosure) in which the high-pressure side communicating oil path L6 and the high clutch oil path L31 are communicated and the low-pressure side communicating oil path L7 and the low clutch oil path L32 are not communicated (cut off).

The second shift valve 82 is configured to be selectively switchable between a set state (a third switching state according to the present disclosure) in which the clutch source oil path L4 and the high-pressure side communicating oil path L6 are communicated and the clutch source oil path L4 and the low-pressure side communicating oil path L7 are not communicated (cut off) and an operating state (a fourth switching state according to the present disclosure) in which the clutch source oil path L4 and the low-pressure side communicating oil path L7 are communicated and the clutch source oil path L4 and the high-pressure side communicating oil path L6 are not communicated (cut off).

The first, second, and third solenoid valves 71, 72, and 73 are normally closed type linear solenoid valves that are opened in accordance with a value of an electric current passed through first, second, and third solenoids 71a, 72a, and 73a and output a control pressure according to the value of the passed electric current and are closed and stop output of the control pressure when the electric current is cut off.

The control pressure output from the first solenoid valve 71 is supplied to the fifth port P81e of the first shift valve 81 as a back pressure that presses the fifth port P81e toward a left opening side of FIG. 2. As a result, an oil pressure corresponding to the control pressure is supplied from the first solenoid valve 71 to the first shift valve 81, and thereby the first shift valve 81 is switched between the operating state and the set state. The control pressure output from the second solenoid valve 72 is supplied to the fourth port P82d of the second shift valve 82 as a back pressure that presses the fourth port P82d toward a left opening side of FIG. 2. As a result, an oil pressure corresponding to the control pressure is supplied from the second solenoid valve 72 to the second shift valve 82, and thereby the second shift valve 82 is switched between the operating state and the set state. Furthermore, the control pressure output from the third solenoid valve 73 is supplied to the fourth port P61d of the regulator valve 61 as a back pressure that presses the fourth port P61d toward a right opening side of FIG. 2. Thereby, the regulator valve 61 is switched between the operating state and the set state.

Figures 3A, 3B:
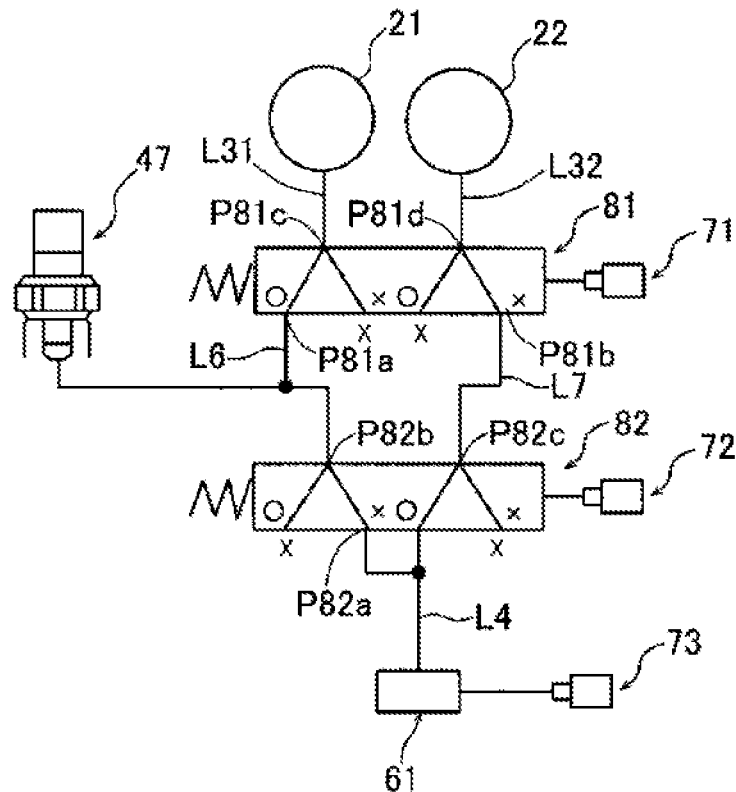
FIG. 3A is a simplified circuit diagram illustrating a part of the hydraulic circuit.
FIG. 3B is a table illustrating patterns of engagement and release of a high clutch and a low clutch.

FIG. 3A is a simplified circuit diagram of a part of the hydraulic circuit 40, and FIG. 3B is a table illustrating patterns of switching between engagement and release of the high clutch 21 and the low clutch 22. FIGS. 4A through 4D are circuit diagrams illustrating states corresponding to the patterns illustrated in the table of FIG. 3B and are views for explaining patterns of switching between engagement and release of the high clutch 21 and the low clutch 22. As the patterns of switching between engagement and release of the high clutch 21 and the low clutch 22, there are four kinds of patterns illustrated in the table of FIG. 3B and the circuit diagrams of FIGS. 4A through 4D corresponding to combinations of the set state and the operating state of the first shift valve 81 and the second shift valve 82.

Figure 4A:
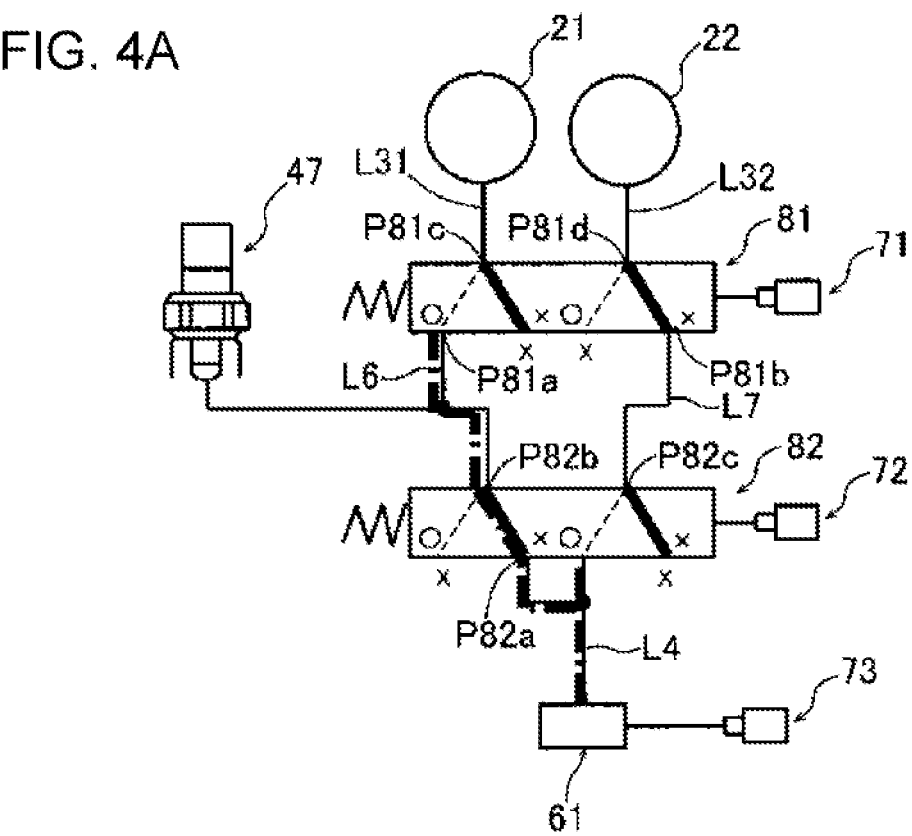
FIGS. 4A through 4D are circuit diagrams illustrating states corresponding to the patterns illustrated in the table of FIG. 3B.

In the state of FIG. 4A, in which both of the first shift valve 81 and the second shift valve 82 are in the set state, oil is not supplied to the high clutch oil path L31 nor the low clutch oil path L32. As a result, both of the high clutch 21 and the low clutch 22 are released (Lo released and Hi released). In this case, the first port P82a and the second port P82b of the second shift valve 82 are communicated, and thereby oil supplied from the regulator valve 61 to the clutch source oil path L4 is supplied to the high-pressure side communicating oil path L6. In this case, the first port P82a and the third port P82c of the second shift valve 82 are not communicated, and therefore oil supplied from the regulator valve 61 to the clutch source oil path L4 is not supplied to the low-pressure side communicating oil path L7.

Figure 4B:
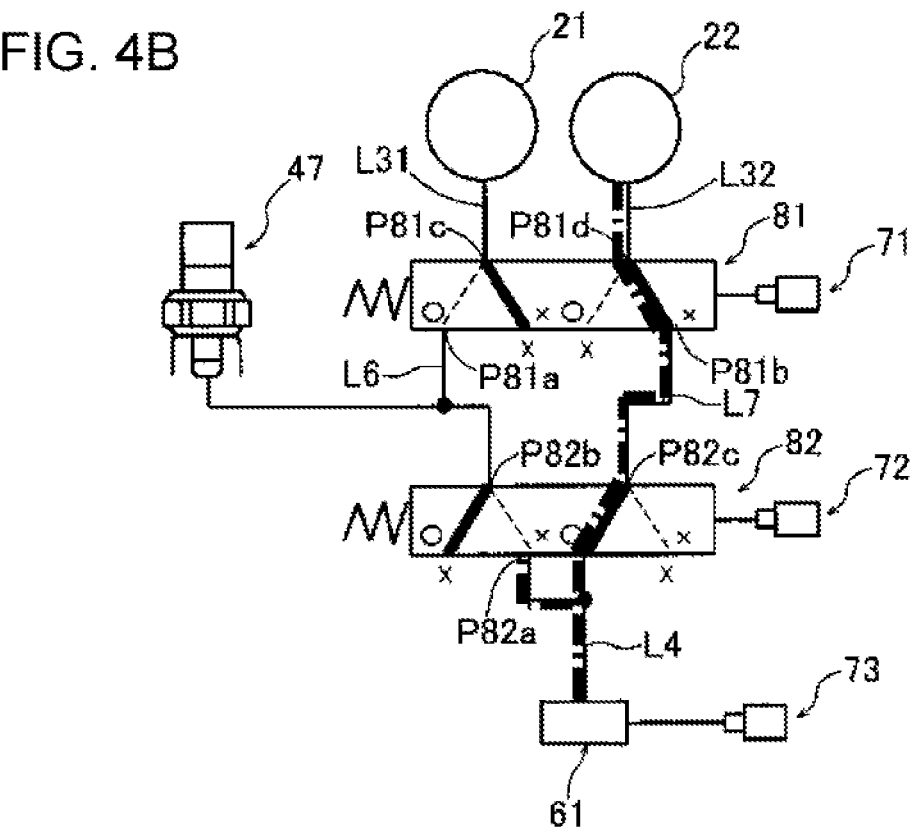

In the state of FIG. 4B, in which the first shift valve 81 is in the set state and the second shift valve 82 is in the operating state, oil is not supplied to the high clutch oil path L31, and oil is supplied only to the low clutch oil path L32. As a result, the high clutch 21 is released and the low clutch 22 is engaged (Lo engaged, Hi released). In this case, the first port P82a and the second port P82b of the second shift valve 82 are not communicated, and therefore oil supplied from the regulator valve 61 to the clutch source oil path L4 is not supplied to the high-pressure side communicating oil path L6.

Figure 4C:
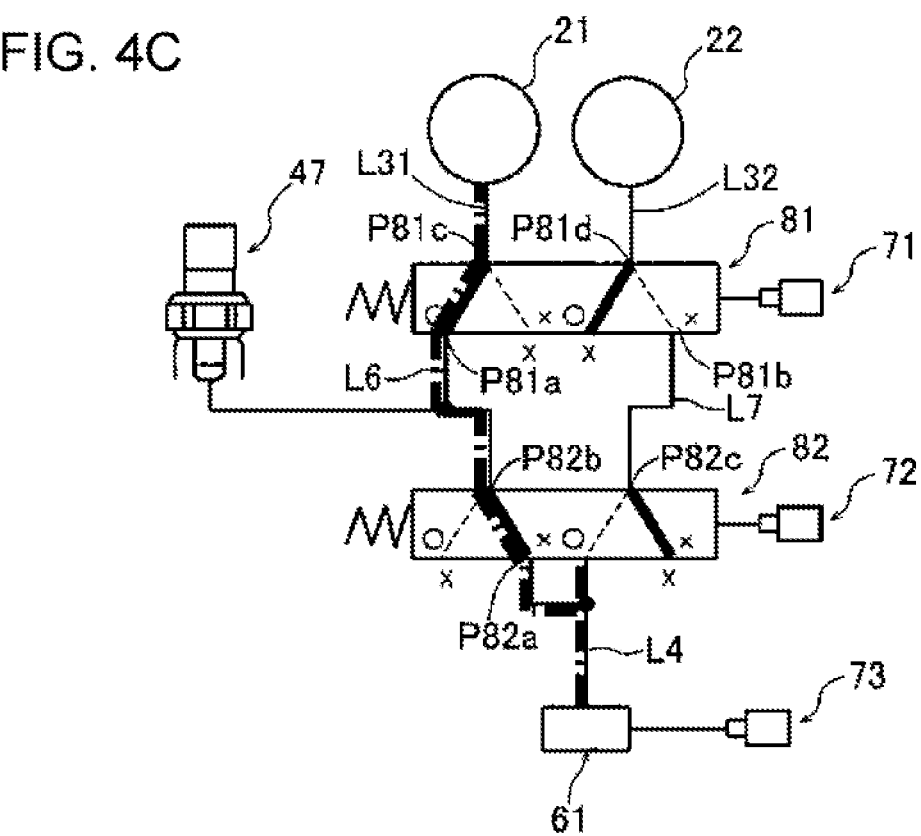

In the state of FIG. 4C, in which the first shift valve 81 is in the operating state and the second shift valve 82 is in the set state, oil is not supplied to the low clutch oil path L32, and oil is supplied only to the high clutch oil path L31. As a result, the low clutch 22 is released and the high clutch 21 is engaged (Lo released, Hi engaged). In this case, the first port P82a and the second port P82b of the second shift valve 82 are communicated, and thereby oil supplied from the regulator valve 61 to the clutch source oil path L4 is supplied to the high-pressure side communicating oil path L6.

Figure 4D:
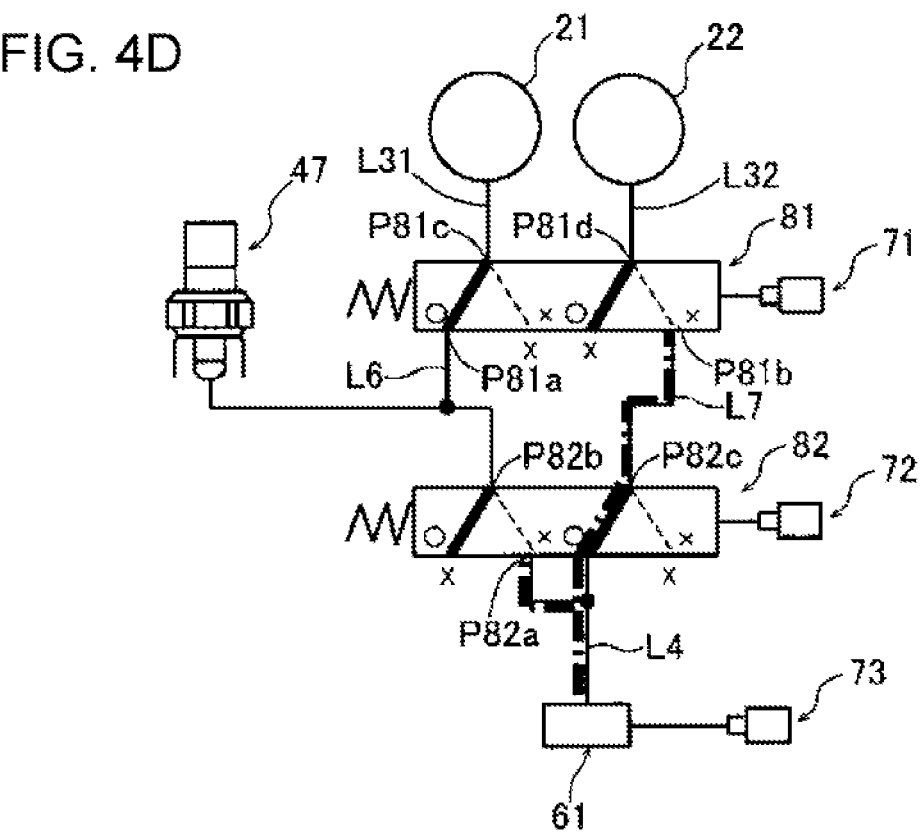

In the state of FIG. 4D, in which both of the first shift valve 81 and the second shift valve 82 are in the operating state, oil is not supplied to the high clutch oil path L31 nor the low clutch oil path L32. As a result, both of the high clutch 21 and the low clutch 22 are released (Lo released, Hi released). In this case, the first port P82a and the second port P82b of the second shift valve 82 are not communicated, and therefore oil supplied from the regulator valve 61 to the clutch source oil path L4 is not supplied to the high-pressure side communicating oil path L6.

In a case where a high line pressure is set while setting the regulator valve 61 to the set state in the state of FIG. 4A, the vehicle 1 is in an engine travelling preparation mode (a high clutch preparation mode or a low clutch preparation mode) for preparing for engine travelling in which the high clutch 21 or the low clutch 22 is engaged and thereby the vehicle 1 is caused to travel by driving force of the engine 10. In a case where a low line pressure is set while setting the regulator valve 61 to the operating state in the state of FIG. 4A, the vehicle 1 is in an EV travelling mode set during motor travelling (EV travelling) in which the vehicle 1 is caused to travel by driving force of the first electric motor 11. In this EV travelling mode, both of the first solenoid valve 71 and the second solenoid valve 72 are off, and therefore electric power consumption can be reduced. In FIGS. 4B and 4C, the vehicle 1 is in the engine travelling mode in which the low clutch 22 and the high clutch 21 are engaged and thereby the vehicle 1 is caused to travel by driving force of the engine 10. FIG. 4D is a mode set in order to assure safety in a case where the first, second, and third solenoid valves 71, 72, and 73 are opened upon occurrence of a trouble such as a failure of the regulator valve 61.

Figure 5A:
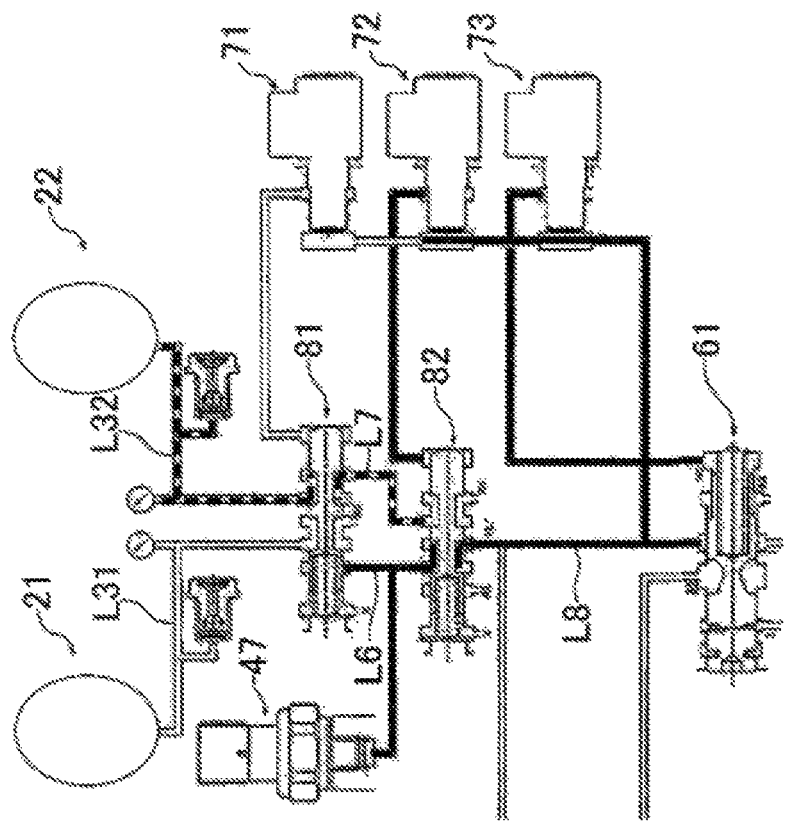
FIG. 5A illustrates the hydraulic circuit in a mode of preparation of engagement of a high clutch.
Figure 5B:
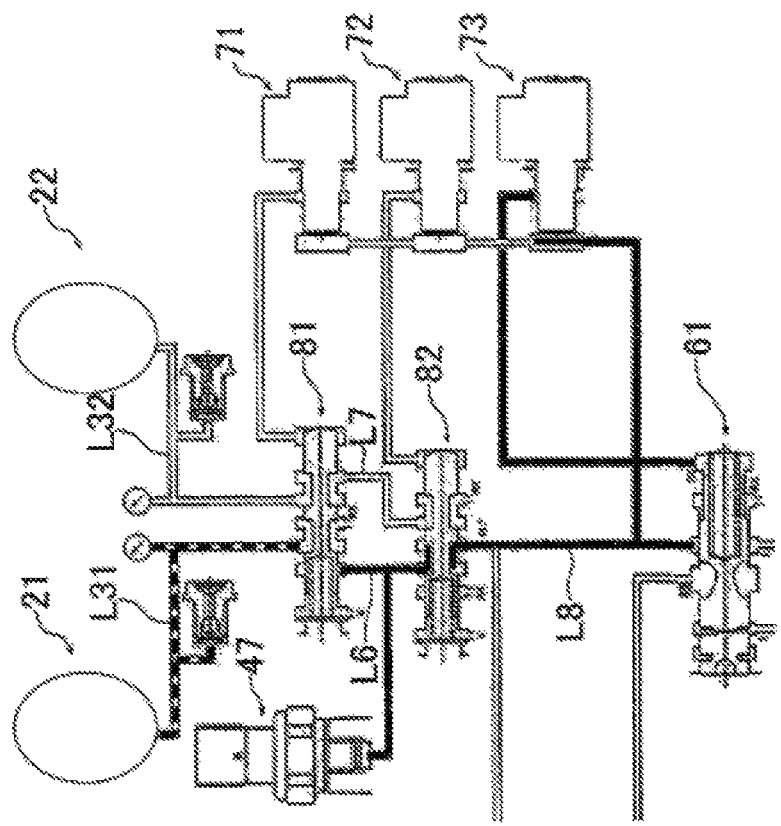
FIG. 5B illustrates the hydraulic circuit in a mode of preparation of engagement of a low clutch.

FIG. 5A illustrates the hydraulic circuit in a mode of preparation for high clutch engagement, and FIG. 5B illustrates the hydraulic circuit in a mode of preparation for low clutch engagement. As illustrated in FIG. 5A, in a case where the mode of preparation for engagement of the high clutch 21 shifts to a state of engagement of the high clutch 21, an oil path through which oil is to be supplied is the high clutch oil path L31 only. Meanwhile, as illustrated in FIG. 5B, in a case where the mode of preparation for engagement of the low clutch 22 shifts to a state of engagement of the low clutch 22, an oil path through which oil is to be supplied is an oil path combining the low clutch oil path L32 and the low-pressure side communicating oil path L7.

Since rotation whose speed has been increased is input to the high clutch 21 from the first driven gear 24 on the input shaft 14, centrifugal force that acts on oil in an oil chamber (piston chamber) of the high clutch 21 tends to be larger than centrifugal force that acts on oil in an oil chamber (piston chamber) of the low clutch 22. For this reason, it is feared that response of switching between clutch engagement and release based on supply or discharge of oil to and from an oil chamber is harder to assure in the high clutch 21 than in the low clutch 22. Meanwhile, the hydraulic circuit 40 according to the present embodiment, it is possible to assure response of engagement of the high clutch 21 since the high clutch oil path L31 that is an oil path through which oil is to be supplied in a case where the mode of preparation of engagement of the high clutch 21 switches to engagement of the high clutch 21 is shorter than a combination of the low clutch oil path L32 and the low-pressure side communicating oil path L7 that are oil paths through which oil is to be supplied in a case where the mode of preparation of engagement of the low clutch 22 switches to engagement of the low clutch 22 as illustrated in FIGS. 5A and 5B. That is, the hydraulic circuit 40 according to the present embodiment is a hydraulic circuit that places importance on response of engagement of the high clutch 21.

As described above, according to the hydraulic circuit 40 according to the present embodiment, two shift valves, i.e., the first shift valve 81 and the second shift valve 82 are provided in series as a configuration for switching an oil path between the clutch source oil path L4 through which oil whose pressure has been regulated by the regulator valve 61 flows and the high clutch oil path L31 and the low clutch oil path L32, and it is therefore possible to switch a state where only one of the high clutch 21 and the low clutch 22 is engaged and a state where both of the high clutch 21 and the low clutch 22 are released by switching states of the first and second shift valves 81 and 82.

With the above configuration, the hydraulic circuit 40 is a hydraulic circuit that has no risk of occurrence of a phenomenon (simultaneous engagement) in which the high clutch 21 and the low clutch 22 are simultaneously engaged, irrespective of setting of switching of the first and second shift valves 81 and 82. In particular, there is no risk of simultaneous supply of oil to the high clutch oil path L31 and the low clutch oil path L32 since communication between the clutch source oil path L4 and the high-pressure side communicating oil path L6 and the low-pressure side communicating oil path L7 is selectively switched by the second shift valve 82.

Since the first and second shift valves 81 and 82 are connected in series, both of the high clutch 21 and the low clutch 22 can be released both by setting both of the first shift valve 81 and the second shift valve 82 to the set state and by setting both of the first shift valve 81 and the second shift valve 82 to the operating state.

Furthermore, the hydraulic circuit 40 according to the present embodiment is provided with the oil pressure sensor (oil pressure detection unit) 47 that detects an oil pressure of the high-pressure side communicating oil path L6. According to this configuration, the oil pressure sensor 47 is provided in the high-pressure side communicating oil path L6 through which oil from the second shift valve 82 flows and that is communicated with the high clutch oil path L31 through the first shift valve 81. Therefore, even if a failure (off failure) in which the second solenoid valve 72 (or the second shift valve 82) cannot shift into the operating state (the fourth switching state according to the present disclosure) occurs in the second solenoid valve 72 (or the second shift valve 82), such a failure can be speedily detected on the basis of a change of the oil pressure of the high-pressure side communicating oil path L6. This allows speedy shift into necessary fail safe operation. That is, if an oil pressure sensor is provided in the low-pressure side communicating oil path L7, the failure is detected on the basis of a change of an oil pressure of oil supplied to the low clutch 22 (i.e., absence of proper rise of the oil pressure of the low-pressure side communicating oil path L7), and therefore accuracy of detection depends on a configuration variation of the low clutch 22 such as energizing force of an energizing unit such as a return spring provided in the oil chamber (piston chamber) of the low clutch 22. This may undesirably inhibit speedy detection of a failure. Meanwhile, in a case where the oil pressure sensor 47 is provided in the high-pressure side communicating oil path L6 as in the present embodiment, it is possible to speedily and accurately detect a failure since it is easier to detect absence of proper drop of an oil pressure of the high-pressure side communicating oil path L6.

In the hydraulic circuit 40 according to the present embodiment, in a case where a failure (on failure) in which the second solenoid valve 72 (or the second shift valve 82) remains in the operating state (the fourth switching state according to the present disclosure) occurs, there is a risk of forced shift into a state (low mode) in which the clutch source oil path L4 and the low-pressure side communicating oil path L7 are communicated and an oil pressure is supplied to the low clutch 22. Meanwhile, in the present embodiment, the oil pressure sensor 47 provided in the high-pressure side communicating oil path L6 makes it possible to detect absence of proper rise of the oil pressure of the high-pressure side communicating oil path L6, thereby making it possible to properly determine the failure of forced shift into the low mode.

Furthermore, in the hydraulic circuit 40 according to the present embodiment, if an oil path (an oil path branched from the source oil path L8) communicated with the feedback port P61c of the regulator valve 61 is blocked due to occurrence of clogging of the oil path, there is a risk of occurrence of a failure in the regulator valve 61 (the regulator valve 61 gets stuck in an on state). In a case where such a failure occurs, the line pressure gradually increases, and finally all of the first, second, and third solenoid valves 71, 72, and 73 are turned on (opened). In this case, the third solenoid valve 73 is opened first and then the first and second solenoid valves 71 and 72 are opened because of differences in upper-limit holding pressure among the first, second, and third solenoid valves 71, 72, and 73. It is therefore possible to detect an abnormality by using a pressure detected by the oil pressure sensor 47 when the third solenoid valve 73 is opened.

Figure 6:
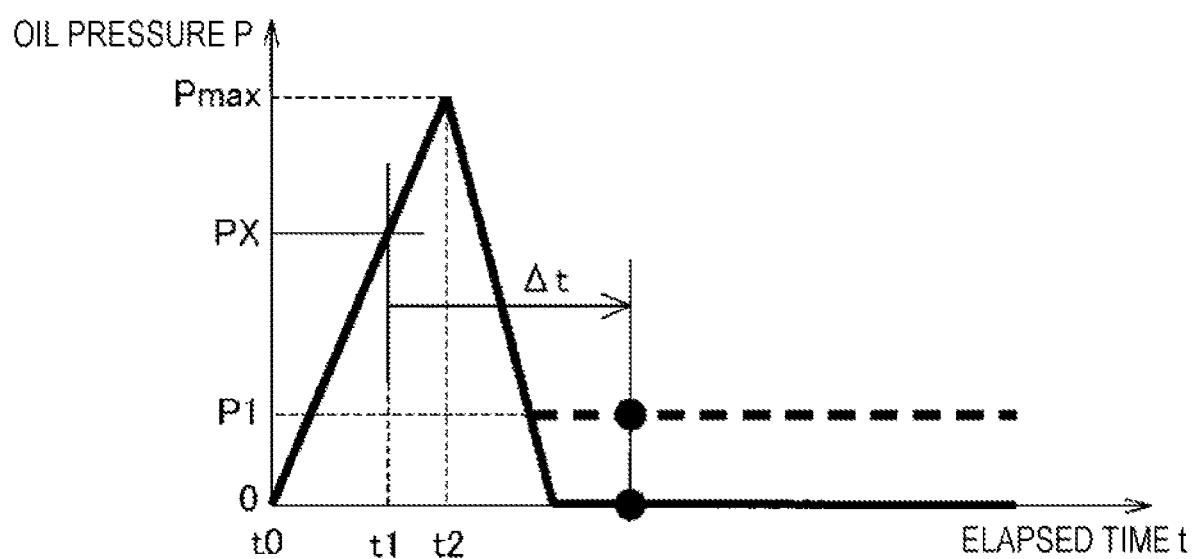
FIG. 6 is a graph illustrating a change of an oil pressure detected by an oil pressure sensor.

FIG. 6 is a graph illustrating a change of an oil pressure detected by the oil pressure sensor 47. In the graph of FIG. 6, the vertical axis represents an oil pressure P detected by the oil pressure sensor 47, and the horizontal axis represents an elapsed time t. The oil pressure sensor 47 detects a change of the oil pressure P like the one illustrated in FIG. 6 in some cases. The oil pressure P rapidly rises from a time t0 and reaches a threshold value PX at a time t1. Then, the oil pressure P further rises and reaches a peak value Pmax at a time t2 and then decreases. As indicated by the dotted line in the graph, in a case where the oil pressure P is a low line pressure P1 after elapse of a specified period Δt from the time at which the oil pressure P exceeds the threshold value PX, it can be determined that the failure is not occurring in the regulator valve 61 and the rapid change of the oil pressure P that reaches the peak value Pmax at the time t2 is merely a surge pressure. Meanwhile, as indicated by the solid line in the graph, in a case where the oil pressure P is 0 (including a case where the oil pressure P is a value that can be regarded as substantially 0) after elapse of the specified period Δt from the time at which the oil pressure P exceeds the threshold value PX, it can be determined that the failure is occurring in the regulator valve 61 and the change of the oil pressure P that reached the peak value Pmax at the time t2 occurred because of opening of the third solenoid valve 73. In this way, it is possible to detect an abnormally high pressure resulting from the failure of the regulator valve 61 on the basis of a transient characteristic of the oil pressure P.

In the hydraulic circuit 40 according to the present embodiment, the regulator valve 61 can be selectively switched between an operating state (the fifth switching state according to the present disclosure) in which a line pressure is regulated to a high line pressure as an oil pressure supplied to the clutch source oil path L4 and a set state (the sixth switching state according to the present disclosure) in which a line pressure is regulated to a low line pressure as an oil pressure supplied to the clutch source oil path L4 by switching on and off of the third solenoid valve 73. In a case where a failure (off failure) in which the third solenoid valve 73 (or the regulator valve 61) cannot be switched to the operating state occurs in the third solenoid valve 73 (or the regulator valve 61), the oil pressure sensor 47 provided in the high-pressure side communicating oil path L6 makes it possible to speedily detect the failure on the basis of a change of the oil pressure of the high-pressure side communicating oil path L6. This allows speedy shift to necessary fail safe operation. Furthermore, the oil pressure sensor 47 provided in the high-pressure side communicating oil path L6 makes it possible to detect the failure in a mode in which oil is supplied to the high-pressure side communicating oil path L6. That is, the failure can be detected in a larger number of modes than a case where an oil pressure sensor is provided in the low-pressure side communicating oil path L7. It is therefore possible to improve accuracy of detection of a failure.

Although the embodiment of the present disclosure has been described above, the present disclosure is not limited to the above embodiment and can be modified in various ways within a scope of the technical idea described in the claims, specification, and drawings. For example, although a case where the oil pressure sensor 47 is provided only in the high-pressure side communicating oil path L6 in the hydraulic circuit according to the above embodiment has been described, an oil pressure sensor (illustration and detailed description thereof are omitted) may be provided in the high clutch oil path L31 that is an oil path provided right before the high clutch 21 or the low clutch oil path L32 that is an oil path provided right before the low clutch 22 instead of the oil pressure sensor 47 provided in the high-pressure side communicating oil path L6 or an oil pressure sensor (illustration and detailed description thereof are omitted) may be provided in the high clutch oil path L31 and the low clutch oil path L32 in addition to the oil pressure sensor 47 provided in the high-pressure side communicating oil path L6. By providing an oil pressure sensor in the high clutch oil path L31 and the low clutch oil path L32, it is possible to further improve clutch torque control accuracy.

Second Embodiment

The second embodiment of the present invention will be described below. In figures of the second embodiment, the identical or corresponding structural portions are designated by the same reference characters as in the first embodiment. Some explanations of such identical or corresponding structural portions may be omitted, except the following disclosure.

Figure 7:
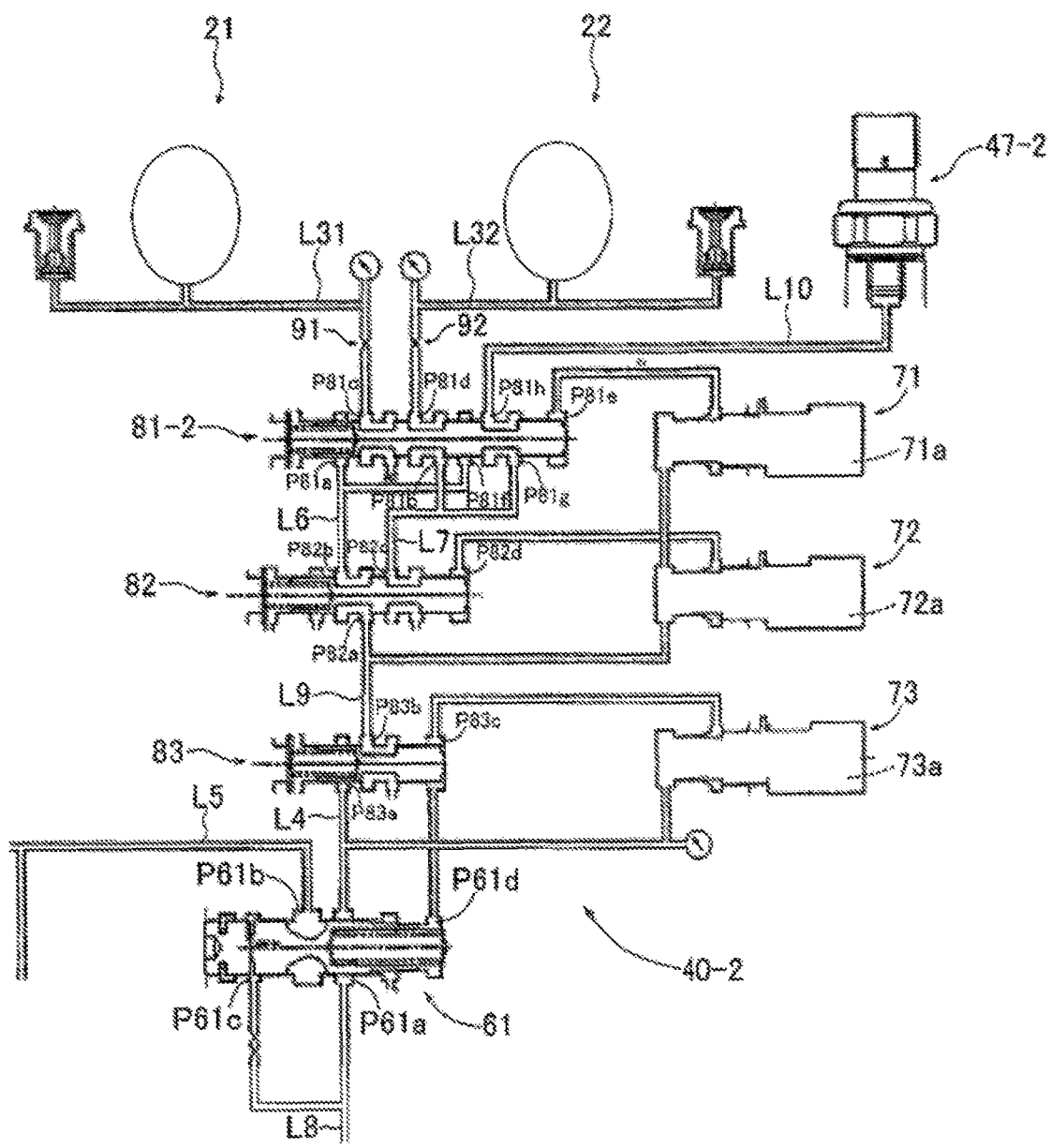
FIG. 7 illustrates the hydraulic circuit according to a second embodiment of the present disclosure.

FIG. 7 shows the hydraulic circuit according to the second embodiment of the present invention. The hydraulic circuit 40-2 of FIG. 7 has a structure identical to the hydraulic circuit 40 of the first embodiment, except for the followings.

[1] The hydraulic circuit 40-2 has a first shift valve 81-2 in which an additional port is disposed, replacing the first shift valve 81.

[2] The hydraulic circuit 40-2 has an oil pressure sensor 47-2 which detects the oil pressure in the oil path L10 connected to the first shift valve 81-2, replacing the oil pressure sensor 47 which detects the oil pressure in the high-pressure side communicating oil path L6.

[3] The hydraulic circuit 40-2 further has a third shift valve 83 and is configured such that switching of the third shift valve 83 is performed by a third solenoid valve 83.

[4] The hydraulic circuit 40-2 has an orifice 91 (a first flow amount regulator) provided in the high clutch oil path L31 and an orifice 92 (a second flow amount regulator) provided in the low clutch oil path L32.

Next, the above different structures and operations will be described in detail.

The first shift valve 81-2 has, in addition to the first shift valve 81 of the first embodiment, a sixth port P81f, a seventh port P81g, and an eighth port P81h faced to the outer circumferential surface of the spool. The sixth port P81f, the seventh port P81*g*, and the eighth port P81*h* are disposed between the second port P81*b* and the fifth port P81*e*. There is a branched oil path from the high-pressure side communicating oil path L6 and the branched oil path is connected to the sixth port P81*f*. There is a branched oil path from the low-pressure side communicating oil path L7 and the branched oil path is connected to the seventh port P81*g*. A sensor oil path (a third communication oil path) is connected to the eighth port P81*h* and the sensor oil path is communicated with the oil pressure sensor 47-2.

In the above configuration, the first shift valve 81-2 allows the high-pressure side communicating oil path L6 and the sensor oil path L10 to communicate with each other and allows the high-pressure side communicating oil path L6 and the high clutch oil path L31 not to communicate (shut off), in the operating state (the first switching state according to the present invention) in which the high-pressure side communicating oil path L6 and the high clutch oil path L31 are communicate, and the low-pressure side communicating oil path L7 and the low clutch oil path L32 are not communicated (shut off). The first shift valve 81-2 also allows the low-pressure side communicating oil path L7 and the sensor oil path L10 to communicate with each other, in the set state (the second switching state according to the present invention) in which the low-pressure side communicating oil path L7 and the low clutch oil path L32 are communicated.

The third shift valve 83 is disposed in the source oil path L4, which is between the pressure-regulating valve 61 and the second shift valve 82. The third shift valve 83 has a spool biased to the right side by a spring member. The spool has a groove formed therein, a first port P83*a*, a second port P83*b*, and a third port P83*c* which are in positions opened to the outer circumferential surface of the spool. The first port P83*a* is connected to the pressure-regulating valve 61 via the source oil path L4. The second port P83*b* is connected to the first port P82*a* of the second shift valve 82 via the oil path L9. The third port P83*c* is connected to the third solenoid valve 73 and the forth port P61*d* of the regulator valve 61. Thus, the regulating pressure outputted from the third solenoid valve 73 is inputted to the third port P83*c* of the third shift valve 83 as back pressure which pushes these to the opening side, that is, to the left side in the figure.

According to the above configurations, the third shift valve 83 is configured such that it can selectively takes either of the operating state which connects the source oil path L4 and the oil path L9 (the second shift valve 82) to communicate with each other or the set state which disconnects the source oil path L4 and the oil path L9 (the second shift valve 82) not to communicate with each other (shut off).

In addition, the first orifice 91 (the first flow amount adjusting means) is disposed in the high clutch oil path L31, and the second orifice 92 (the second flow amount adjusting means or regulator) is disposed in the low clutch oil path L32. The first orifice 91 is configured to control and reduce the flow amount of oil to be supplied to the high clutch 21 via the high clutch oil path L31, and the second orifice 92 is configured to control and reduce the flow amount of oil to be supplied to the low clutch 22 via the low clutch oil path L32.

Figure 8A:
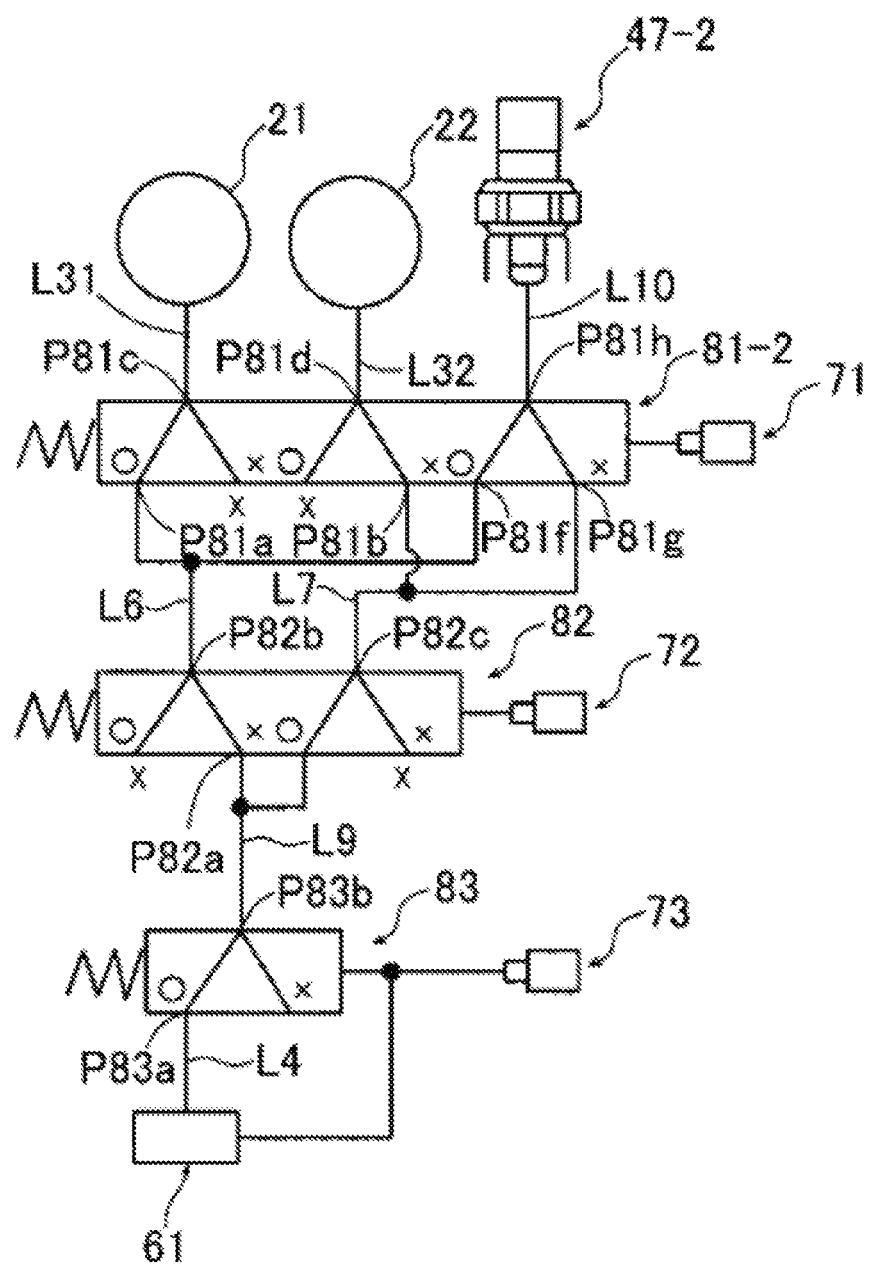
FIG. 8A is a schematic view of the hydraulic circuit of the second embodiment, part of the circuit being omitted.

FIG. 8A is a simplified schematic view of the hydraulic circuit 40-2 with some part of the circuit is omitted. FIG. 8B is a table showing switching patterns between connections and disconnections of the high clutch 21 and the low clutch 22. FIG. 9 shows the state of circuits corresponding to each pattern shown in the table of FIG. 8B for illustrating the switching patterns between connections and disconnections of the high clutch 21 and the low clutch 22. The switching patterns between connections and disconnections of the high clutch 21 and the low clutch 22 include five different patterns according to the set state and the operating state of the first shift valve 81, the second shift valve 82 and the third shift valve 83, as shown in the table of FIG. 8B and the circuits of FIGS. 9A-9B.

Figure 9A:
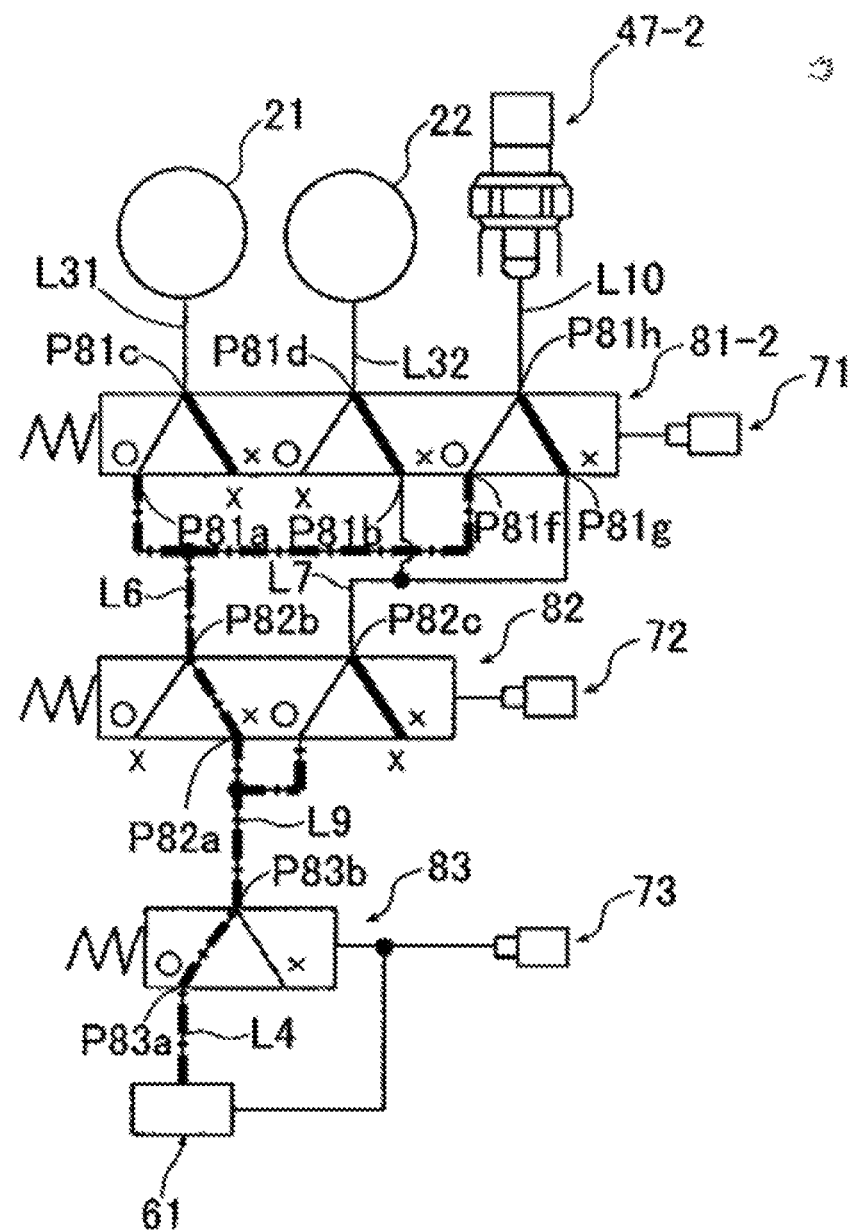
FIGS. 9A, 9B, 9C and 9D show states of the circuits showing each switching pattern of the table of FIG. 8B.

In the state of FIG. 9A, the oil is not supplied to either of the high clutch oil path L31 or the low clutch oil path L32, as both of the first shift valve 81-2 and the second shift valve 82 are in the set state, and the third shift valve 83 is in the operating state. In this manner, both of the high clutch 21 and the low clutch 22 are in the released state (Lo released, and Hi released). In this case, since the sixth port P81*f* and the eighth port P81*h* of the first shift valve 81-2 are not communicated, the oil which is supplied from the regulator valve 61 to the high-pressure side communicating oil path L6 is not supplied to the sensor oil path L10 (the oil pressure sensor 47-2).

Figure 9B:
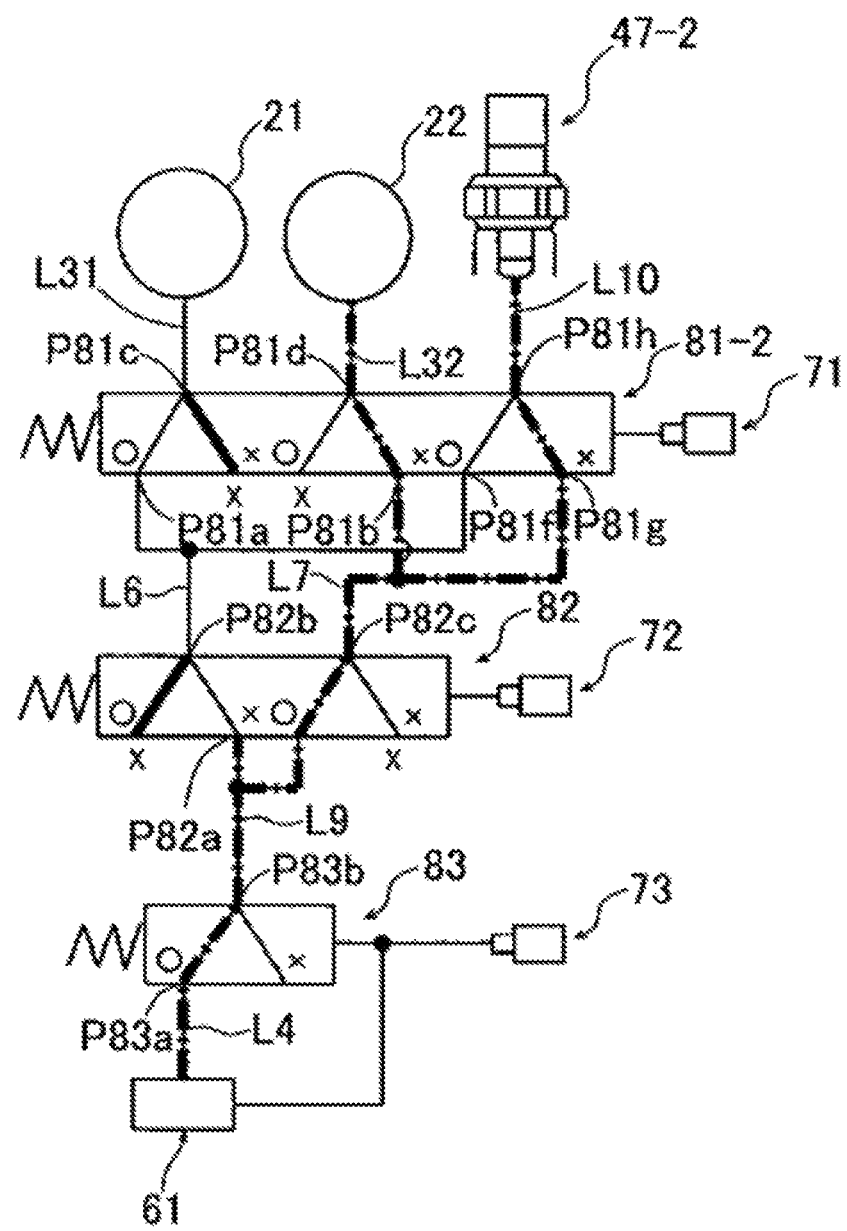

In the state of FIG. 9B, the oil is not supplied to the high clutch oil path L31 and is supplied only to the low clutch oil path L32, as the first shift valve 81 is in the set state, the second shift valve 82 is in the operating state, and the third shift valve 83 is in the operating state. In this manner, the high clutch 21 is in the released state, and the low clutch 22 is in the engaged state (Lo engaged, and Hi released). Since the oil is supplied from the low-pressure side communicating oil path L7 to the sensor oil path L10, the oil pressure is detected by the oil pressure sensor 47-2. Thus, in this state, the oil is supplied to the low clutch 22 and the oil pressure sensor 47-2. Since the second orifice 92 is provided in the low clutch oil path L32 (see FIG. 7), the oil pressure in the oil pressure sensor 47-2 increases faster than the oil pressure in the low clutch 22 (for faster oil pressure elevation).

Figure 9C:
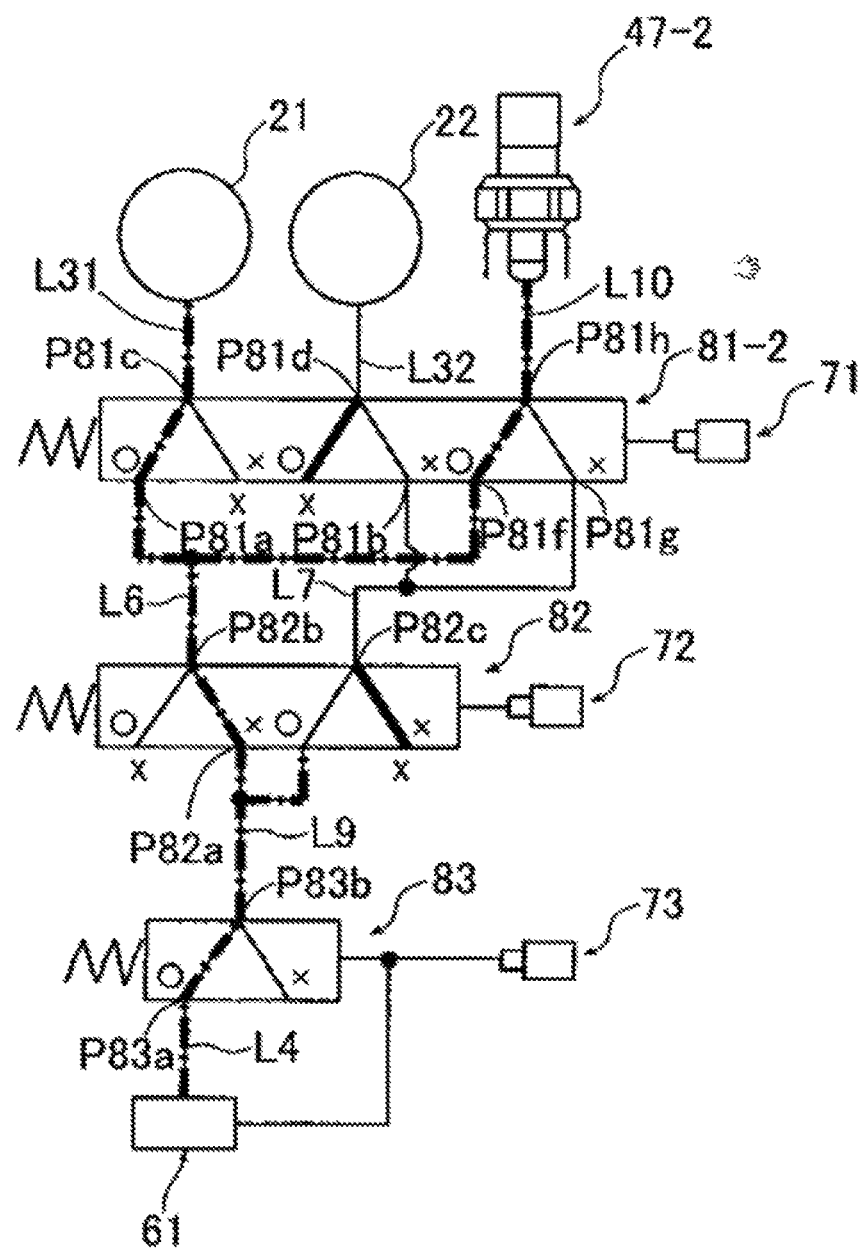

In the state of FIG. 9C, the oil is not supplied to the low clutch oil path L32 and is supplied only to the high clutch oil path L31, as the first shift valve 81 is in the operating state, the second shift valve 82 is in the set state, and the third shift valve 83 is in the operating state. In this manner, the low clutch 22 is in the released state, and the high clutch 21 is in the engaged state (Lo released, and Hi engaged). The oil is supplied from the high-pressure side communicating oil path L6 to the sensor oil path L10, the oil pressure is detected by the oil pressure sensor 47-2. Thus, in this state, the oil is supplied to the high clutch 21 and the oil pressure sensor 47-2. Since the first orifice 91 is provided in the high clutch oil path L31 (see FIG. 7), the oil pressure in the oil pressure sensor 47-2 increases faster than the oil pressure in the high clutch 21 (for faster oil pressure elevation).

Figure 9D:
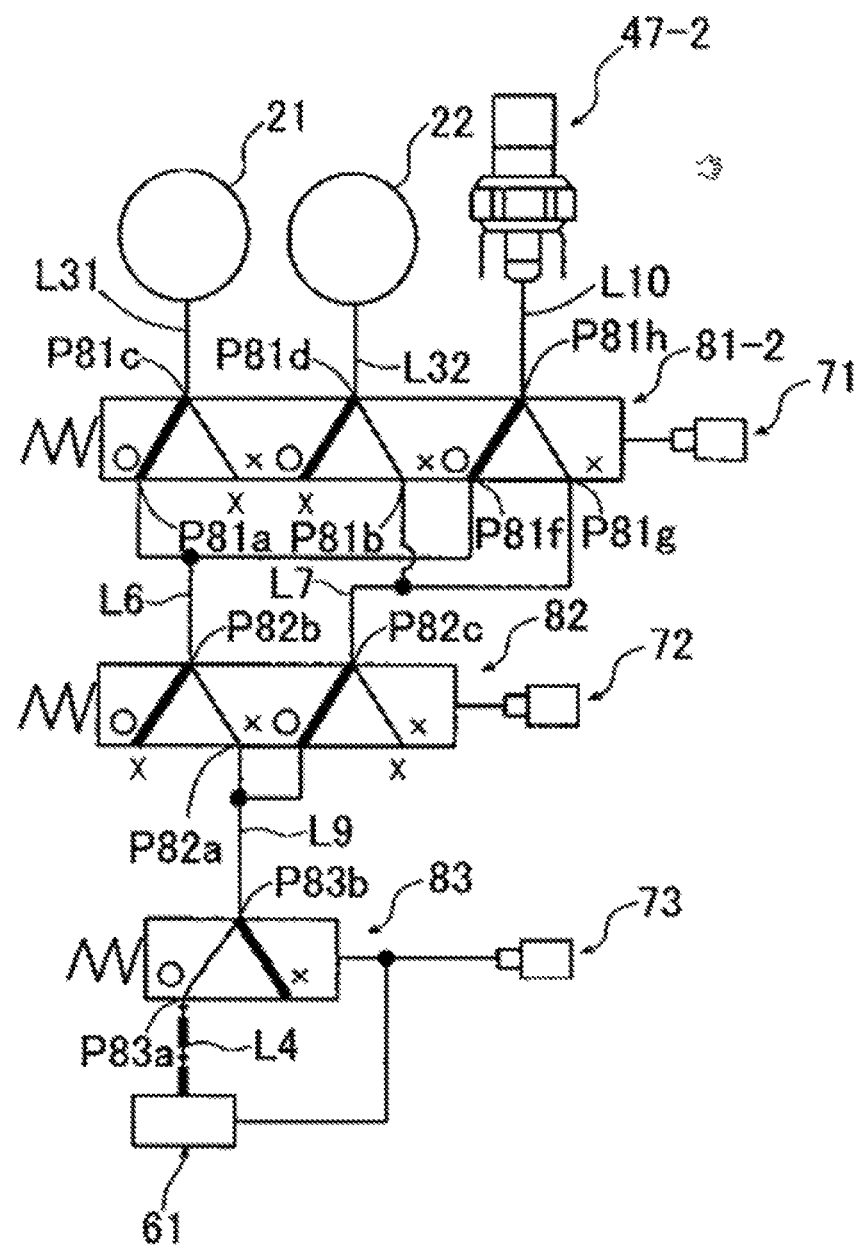

In the state of FIG. 9D, the oil is not supplied to either of the high clutch oil path L31 or the low clutch oil path L32, as each of the first shift valve 81 and the second shift valve 82 is in the operating state, and the third shift valve 83 is in the set state, and therefore, both of the high clutch 21 and the low clutch 22 are in the released state (Lo released, and Hi released). In this case, it is possible to release both the high clutch 21 and the low clutch 22 by stopping the supply of oil from the source oil path L4 by the third shift valve 83, even though the first shift valve 81 and the second shift valve 82 are in the operating states.

As explained above, according to the above embodiments, the hydraulic circuit 40-2 are provided with the sensor oil path L10 to which the oil is introduced via the high-pressure side communicating oil path L6 and the low-pressure side communicating oil path L7, and the oil pressure sensor 47-2 configured to detect the oil pressure in the sensor oil path L10. The hydraulic circuit 40-2 is configured to allow the high-pressure side communicating oil path L6 and the sensor oil path L10 to communicate with each other in the operating state (the first switching state according to the present invention) in which the high-pressure side communicating oil path L6 and the high clutch oil path L31 are communicate, and further configured to allow the low-pressure side communicating oil path L7 and the sensor oil path L10 to communicate in the set state (the second switching state according to the present invention) in which the low-pressure side communicating oil path L7 and the low clutch oil path L32 are communicated.

In the above configuration, it is possible to detect the oil pressure in the high clutch 21 and the oil pressure in the low clutch 22 by the oil pressure sensor (an oil pressure detector) 47-2 provided in the sensor oil path L10. Therefore, it is possible to monitor the states of the high clutch 21 and the low clutch 22 by using only the single oil pressure sensor 47-2, as well as the states of the first shift valve 81-2, the first solenoid valve 71, the second shift valve 82, the second solenoid valve 72, the third shift valve 83, the regulator valve 61, and the third solenoid valve 73. This configuration can realize a hydraulic circuit with high reliability, but lower cost.

In addition, because of the presence of the first orifice 91 provided in the high clutch oil path L31 and the second orifice 92 provided in the low clutch oil path L32, the oil pressure in the oil pressure sensor 47-2 can increase faster than the oil pressure in the high clutch 21 and the low clutch 22 (to allow for the faster oil pressure elevation).

In the above configuration, even if any of the high clutch 21, the low clutch 22, the first-third shift valves 81-2, 82, 83, or the first-third solenoid valves 71, 72, 73 has breakdown or malfunction, such problems can immediately be detected, thereby allowing for quick transition to fail-safe operation as necessary. In particular, since the second orifice 92 is provided in the low clutch oil path L32 which is connected to the low clutch 22, the breakdown can be detected based on the pressure change in the oil supplied to the low clutch 22. In this case, because the second orifice 92 is provided, this can prevent structural variations of the low clutch 22 from affecting the detection accuracy because the detection does not depend upon the structural variations of the low clutch 22.

According to the present embodiment, the hydraulic circuit 40-2 is configured such that the third solenoid valve 73 performs pressure regulation by the pressure-regulating valve 61 and switches operations of the three shift valve 83. In addition, the oil pressure sensor 47-2 is disposed in the sensor oil path L10 through which the oil flows via the high-pressure side communicating path L6 or the low-pressure side communicating path L7. Because of this, when ON state-fixed failure (the valves cannot be returned to OFF) occurs in the first solenoid valve 71 or the second solenoid valve 72, the oil pressure sensor immediately detects the pressure of the oil flowing to the both of the high clutch 21 and the low clutch 22 to prevent the oil supply to each clutch, thereby to quickly transition to fail-safe procedure. In addition, even under undetectable conditions under which the state of the first solenoid valve 71 and the second solenoid valve 72 cannot be detected, it is possible to prevent the supply of oil to each clutch for quick transition to a necessary fail-safe operation.

Some embodiments of the present invention are explained above, however, this invention will not be limited to these embodiments and can be performed in any variable forms within the concept and scope describe in the claims, specification and drawings. For example, although the oil pressure sensor 47 is disposed in only the high-pressure side communicating path L6 in the above embodiment, any other oil pressure sensors can be disposed in the high clutch oil path L31 just upstream of the high clutch 21 and/or the low clutch oil path L32 just upstream of the low clutch 21 in place of the oil pressure sensor 47, or any additional oil pressure sensors can be disposed in the high clutch oil path L31 and/or the low clutch oil path L32 in addition to the oil pressure sensor 47. The addition of oil pressure sensors to the high clutch oil path L31 and/or the low clutch oil path L32 may increase control accuracy of the torque of clutches.

What is claimed is:

1. A hydraulic circuit of a driving device for a vehicle, the hydraulic circuit comprising:
    a first clutch and a second clutch that are disposed in a power transmission path configured to transmit power from a power source of the vehicle to a drive wheel;
    a first clutch oil path connected to an oil chamber of the first clutch;
    a second clutch oil path connected to an oil chamber of the second clutch;
    a pressure-regulating valve configured to regulate a pressure of oil ejected from an oil pump;
    a source oil path through which oil flows, pressure of the oil having been regulated by the pressure-regulating valve for supplying the oil to each of the first and second clutch oil paths;
    a first communicating oil path to make communication between the first clutch oil path and the source oil path;
    a second communicating oil path to make communication between the second clutch oil path and the source oil path;
    a first shift valve configured to switchably allow and stop the communication of the oil between (i) the first clutch oil path and the second clutch oil path and (ii) a first communicating oil path and a second communicating oil path, respectively;
    a first solenoid valve configured to actuate the first shift valve to perform the switching with the first shift valve;
    a second shift valve configured to switchably allow and stop the communication of the oil between (i) the first communicating oil path and the second communicating oil path and (ii) the source oil path, respectively; and
    a second solenoid valve configure to actuate the second shift valve to perform the switching with the second shift valve,
    wherein the first shift valve is configured to selectively switch a state of the communication between a first switching state where the first communicating oil path and the first clutch oil path are communicated and a second switching state where the second communicating oil path and the second clutch oil path are communicated, and
    the second shift valve is configured to selectively switch the state of the communication between a third switching state where the source oil path and the first communicating oil path are communicated and a fourth switching state where the source oil path and the second communicating oil path are communicated.

2. The hydraulic circuit according to claim 1, further comprising an oil pressure detector configured to detect an oil pressure of the first communicating oil path.

3. The hydraulic circuit according to claim 2, further comprising a third solenoid valve configured to perform the pressure regulating by the pressure-regulating valve,
    wherein the pressure-regulating valve is selectively switchable between a fifth switching state where the pressure of the oil is regulated to a high oil pressure that is relatively high as an oil pressure supplied to the source oil path and a sixth switching state where the pressure of the oil is regulated to a low oil pressure that is relatively low as an oil pressure supplied to the source oil path by switching on and off of the third solenoid valve.

4. The hydraulic circuit according to claim 1, wherein
the hydraulic circuit is configured such that centrifugal force that acts on oil in an oil chamber of the first clutch is larger than centrifugal force that acts on oil in an oil chamber of the second clutch; and
a length of the first clutch oil path is shorter than a length of a combination of the second clutch oil path and the second communicating oil path.

5. The hydraulic circuit according to claim 1, further comprising:
a third communicating oil path through which the oil flows via the first communicating oil path or the second communicating oil path; and
an oil pressure detector configured to detect oil pressure in the third communicating oil path, wherein
the first shift valve allows the first communicating oil path and the third communicating oil path to communicate with each other in the first switching state and allows the second communicating oil path and the third communicating oil path to communicate with each other in the second switching state.

6. The hydraulic circuit according to claim 5, further comprising at least one of: a first flow amount regulator disposed in the first clutch oil path; and a second flow amount regulator disposed in the second clutch oil path.

7. The hydraulic circuit according to claim 5, further comprising:
a third shift valve configured to switchably allow and stop the communication of oil in the source oil path between the pressure-regulating valve and the second shift valve; and
a third solenoid valve configured to actuate the first shift valve to perform the switching with the third shift valve.

8. The hydraulic circuit according to claim 7, wherein
the third solenoid valve is further configured to conduct pressure regulation with the pressure-regulating valve,
the pressure-regulating valve is configured to selectably switch a state of communication by switching ON and OFF of the third solenoid valve between: a fifth switching state where the oil having a relatively higher pressure is pressure-regulated and supplied to the source oil path; and a sixth switching state where the oil having a relatively lower pressure is pressure-regulated and supplied to the source oil path.

* * * * *